United States Patent
Niu et al.

(10) Patent No.: US 9,112,669 B2
(45) Date of Patent: *Aug. 18, 2015

(54) FEEDBACK SCHEME FOR MU-MIMO

(71) Applicant: Intel Corporation, Santa Clara, CA (US)

(72) Inventors: Huaning Niu, Milpitas, CA (US); Qinghua Li, San Ramon, CA (US); Honggang Li, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/018,266

(22) Filed: Sep. 4, 2013

(65) Prior Publication Data

US 2014/0010216 A1 Jan. 9, 2014

Related U.S. Application Data

(63) Continuation of application No. 12/845,515, filed on Jul. 28, 2010, now Pat. No. 8,547,955.

(51) Int. Cl.
*H04W 24/00* (2009.01)
*H04L 5/00* (2006.01)
*H04B 7/04* (2006.01)
*H04L 1/00* (2006.01)
*H04B 7/06* (2006.01)

(52) U.S. Cl.
CPC ............ *H04L 5/0073* (2013.01); *H04B 7/0417* (2013.01); *H04B 7/0452* (2013.01); *H04L 1/0027* (2013.01); *H04L 1/0029* (2013.01); *H04B 7/0643* (2013.01)

(58) Field of Classification Search
CPC .. H04B 7/0452; H04B 7/0643; H04L 1/0027; H04L 1/0029; H04L 5/0073
USPC ........................................ 370/252, 345, 346
See application file for complete search history.

(56) References Cited

U.S. PATENT DOCUMENTS

| | | | |
|---|---|---|---|
| 8,315,346 B2 | 11/2012 | Kim et al. | |
| 8,675,743 B2 | 3/2014 | Kotecha et al. | |
| 2005/0181739 A1 | 8/2005 | Krasny et al. | |
| 2009/0004986 A1 | 1/2009 | Park et al. | |
| 2009/0034636 A1 | 2/2009 | Kotecha et al. | |
| 2011/0122971 A1 | 5/2011 | Kim et al. | |
| 2012/0230443 A1* | 9/2012 | Seok et al. | ..................... 375/260 |

FOREIGN PATENT DOCUMENTS

| | | |
|---|---|---|
| WO | 2009023681 | 2/2009 |
| WO | 2010013751 | 2/2010 |

OTHER PUBLICATIONS

Supplementary European Search Report received for European Patent Application No. EP11813215, mailed Jan. 29, 2014, 8 pages.

(Continued)

*Primary Examiner* — Melvin Marcelo
(74) *Attorney, Agent, or Firm* — Kacvinsky Daisak Bluni PLLC

(57) ABSTRACT

Embodiments of a system and method for managing feedback in a MU-MIMO system. An access point can announce one or more of mobile stations that are to receive downlink information in a first frame. The access point can also send a sounding package to the one or more mobile stations and receive feedback from the one or more mobile stations according to the feedback schedule. The feedback may be based on the reception of the sounding package.

17 Claims, 3 Drawing Sheets

(56) References Cited

OTHER PUBLICATIONS

Office Action received for Japanese Patent Application No. 2013-521988, mailed Feb. 25, 2014, 2 pages including 1 page English translation.

Office Action received for Korean Patent Application No. 20137005209, mailed Mar. 14, 2014, 2 pages English translation.

Office Action and Search Report received for Chinese Patent Application No. 201180046865.6, mailed Feb. 2, 2015, 14 pages.

\* cited by examiner

FEEDBACK SCHEME FOR MU-MIMO

CROSS-REFERENCE TO RELATED APPLICATIONS

This application is a continuation of, claims the benefit of and priority to, previously filed U.S. patent application Ser. No. 12/845,515 entitled "FEEDBACK SCHEME FOR MU-MIMO" filed on Jul. 28, 2010, the subject matter of which is hereby incorporated by reference in its entirety.

BACKGROUND

Multiple-user multiple-input multiple-output (MU-MIMO) systems can transmit and receive signals to/from multiple users at a single antenna array at the same time. In a MU-MIMO system, multiple signals are sent in parallel and are kept separate from one another by transmitting (or receiving) each signal in a different (e.g., orthogonal) direction or in a different spatial channel. The process of transmitting (or receiving) a signal in a specific direction using an antenna array is known as beamforming. By selecting a beam for each signal that will produce limited interference with other parallel beams, multiple signals can be transmitted or received at the same time. Beams are often calculated to be orthogonal to one another in order to minimize the interference between the beams.

There are two different types of beamforming systems: implicit and explicit. In implicit beamforming the access point calculates the beamforming matrix based on reciprocal channels. That is, the access point receives uplink signals and based on the reception quality and direction of the uplink signals, the access point determines the direction and other parameters for the downlink beams. In explicit beamforming the access point sends out a sounding signal to the mobile stations. The mobile stations then send feedback to the access point regarding the quality of the received signal. The access point can then use the feedback to generate beams for future downlink signals.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The present inventors have recognized, among other things, a feedback scheme for explicit beamforming enabling multiple mobile stations to provide feedback to an access point in a MU-MIMO system. In the feedback scheme the access point allocates uplink time slots to each mobile station for feedback information. In order to allocate the uplink time slots, the access point determines the length of the feedback from each mobile station. In some examples, the access point can control the length of the feedback from the mobile stations by assigning a number of downlink streams to each mobile station as well as limiting the feedback to a specific type, and a specific modulation and coding scheme. As used herein a stream corresponds to a stream of data to be transmitted as a beam using beamforming techniques and/or spatial multiplexing (SDMA) techniques.

Figure 1:
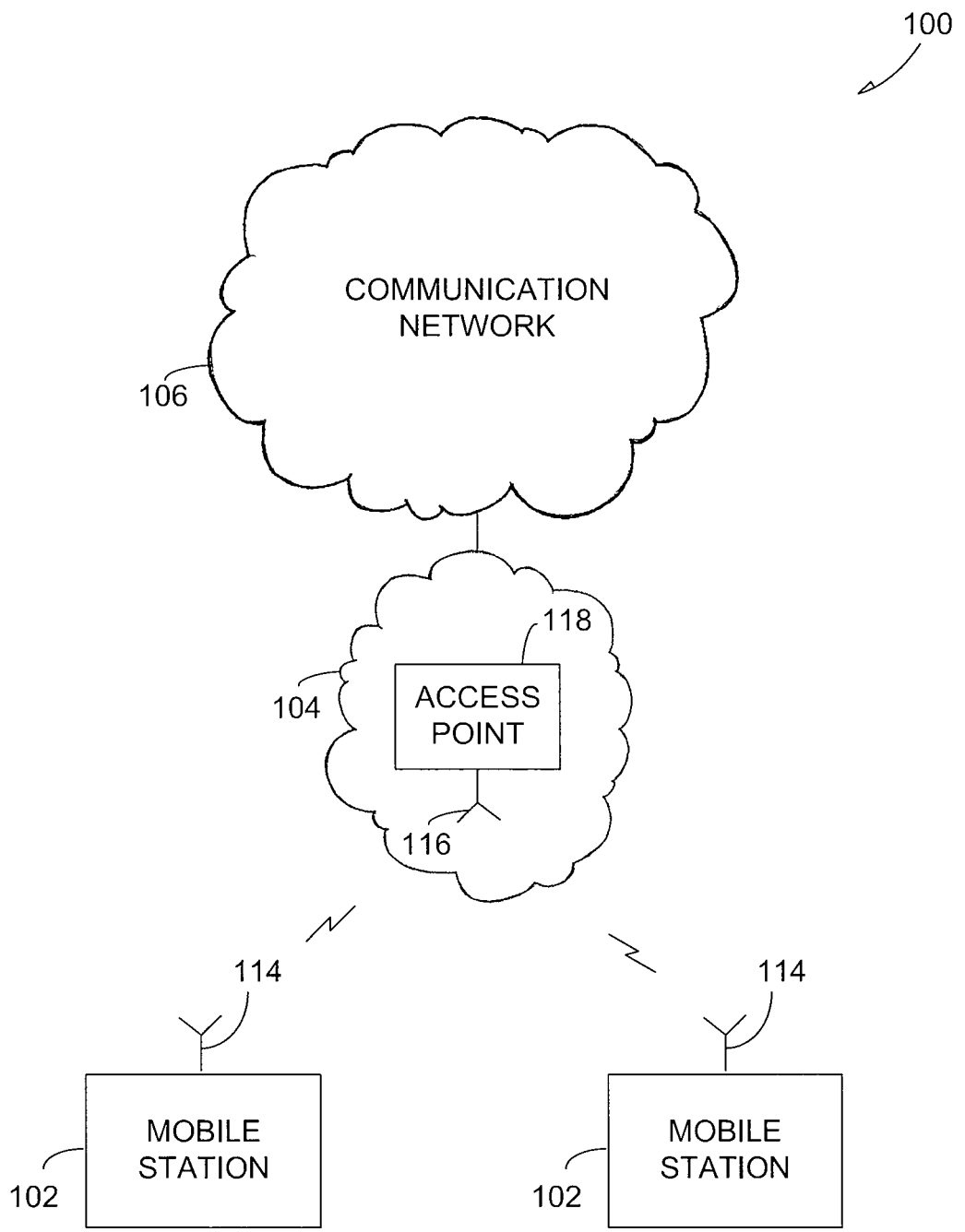
FIG. 1 illustrates an example of a wireless communication system.

FIG. 1 illustrates an example of a wireless communication system 100. The wireless communication system 100 can include a plurality of mobile stations 102 in wireless communication with an access network 104. The access network 104 forwards information between the mobile stations 102 and another communications network 106. Communications network 106 can include the internet, a private intranet, or other network.

In an example, each mobile station 102 can include one or more antennas 114 for transmitting and receiving wireless signals to/from an access point 118 in the access network 104. The access point 118 can implement the air interface to the mobile stations 102, and can transmit and receive signals with an antenna array 116 coupled thereto. The access point 118 can be communicatively coupled to the communications network 106 for forwarding information to/from the mobile stations 106.

Figure 2:
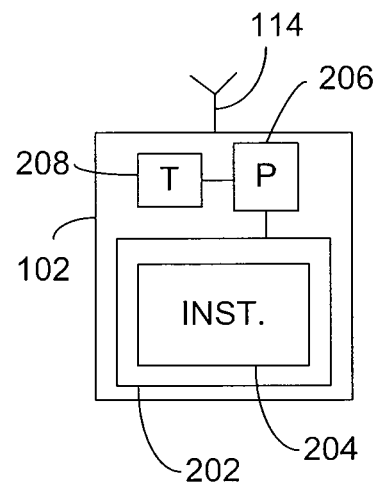
FIG. 2 illustrates an example of a mobile station for communicating in the wireless communication system of FIG. 1.

FIG. 2 illustrates an example of a mobile station 102. The mobile station 102 can include a memory 202 for storage of instructions 204 for execution on processing circuitry 206. The instructions 204 can comprise software configured to cause the mobile station 102 to perform actions for wireless communication between the mobile station 102 and the access point 118. The mobile station 102 can also include an RF transceiver 208 for transmission and reception of signals with the antenna 114.

In some examples, the mobile station 102 can be a personal digital assistant (PDA), a laptop or desktop computer with wireless communication capability, a web tablet, a net-book, a wireless telephone, a wireless headset, a pager, an instant messaging device, a digital camera, an access point, a television, a medical device (e.g., a heart rate monitor, a blood pressure monitor, etc.), or other device that can receive and/or transmit information wirelessly.

Figure 3:
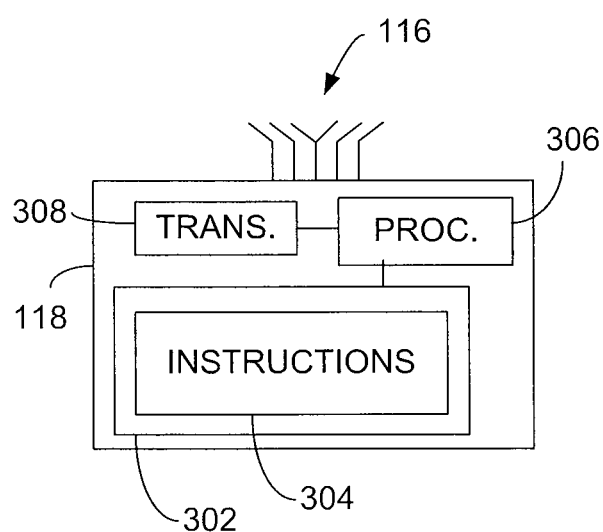
FIG. 3 illustrates an example of an access point for communicating in the wireless communication system of FIG. 1.

FIG. 3 illustrates an example of an access point 118. The access point 118 can include a memory 302 for storage of instructions 304 for execution on processing circuitry 306. The instructions 304 can comprise software configured to cause the access point 118 to perform actions for wireless communication between the mobile station 102 and the access point 118. The access point 118 can also include an RF transceiver 308 for transmission and reception of signals using the antenna array 116. The processing circuitry 306 can be configured to implement beamforming with the antenna array 116. In an example, the processing circuitry 306 can be configured to use the antenna array 116 to implement adaptive beamforming in a MU-MIMO system. That is, multiple beams can be implemented at the same time to different mobile stations 102. Moreover, the direction of each beam can change dynamically according to changes in the signal path to a given mobile station 102. The access point 118 can include a network switch, router, or hub for sending and receiving information with the communications network 106.

In an example, the mobile station 102 and access point 118 can be configured to operate in accordance with one or more frequency bands and/or standards profiles. For example, the mobile station 102 and access point 118 can be configured to communicate in accordance with specific communication standards, such as the Institute of Electrical and Electronics Engineers (IEEE) standards. In particular, the mobile station 102 can be configured to operate in accordance with one or more versions of the IEEE 802.11ac communication standard for MU-MIMO Wi-Fi.

The mobile station 102 and access point 118 can also be configured to operate in accordance with one or more versions of the IEEE 802.16 communication standard for wireless metropolitan area networks (WMANs) including variations and evolutions thereof. For example, the mobile station 102 and access point 118 can be configured to communicate using the IEEE 802.16-2004, the IEEE 802.16(e), and/or the 802.16(m) versions of the 802.16 standard. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

In some examples, the mobile station 102 and access point 118 can be configured to communicate in accordance with one or more versions of the Universal Terrestrial Radio Access Network (UTRAN) Long Term Evolution (LTE) communication standards, including LTE release 8, LTE release 9, and future releases. For more information with respect to UTRAN LTE standards, see the 3rd Generation Partnership Project (3GPP) standards for UTRAN-LTE, release 8, March 2008, including variations and later versions (releases) thereof.

In some examples, RF transceiver 208 and RF transceiver 308 can be configured to transmit and receive orthogonal frequency division multiplexed (OFDM) communication signals which comprise a plurality of orthogonal subcarriers. In broadband multicarrier examples, the mobile station 102 and access point 118 can be configured to communicate in accordance with an orthogonal frequency division multiple access (OFDMA) technique.

In other examples, the mobile station 102 and access point 118 can be configured to communicate using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation.

Figure 4:
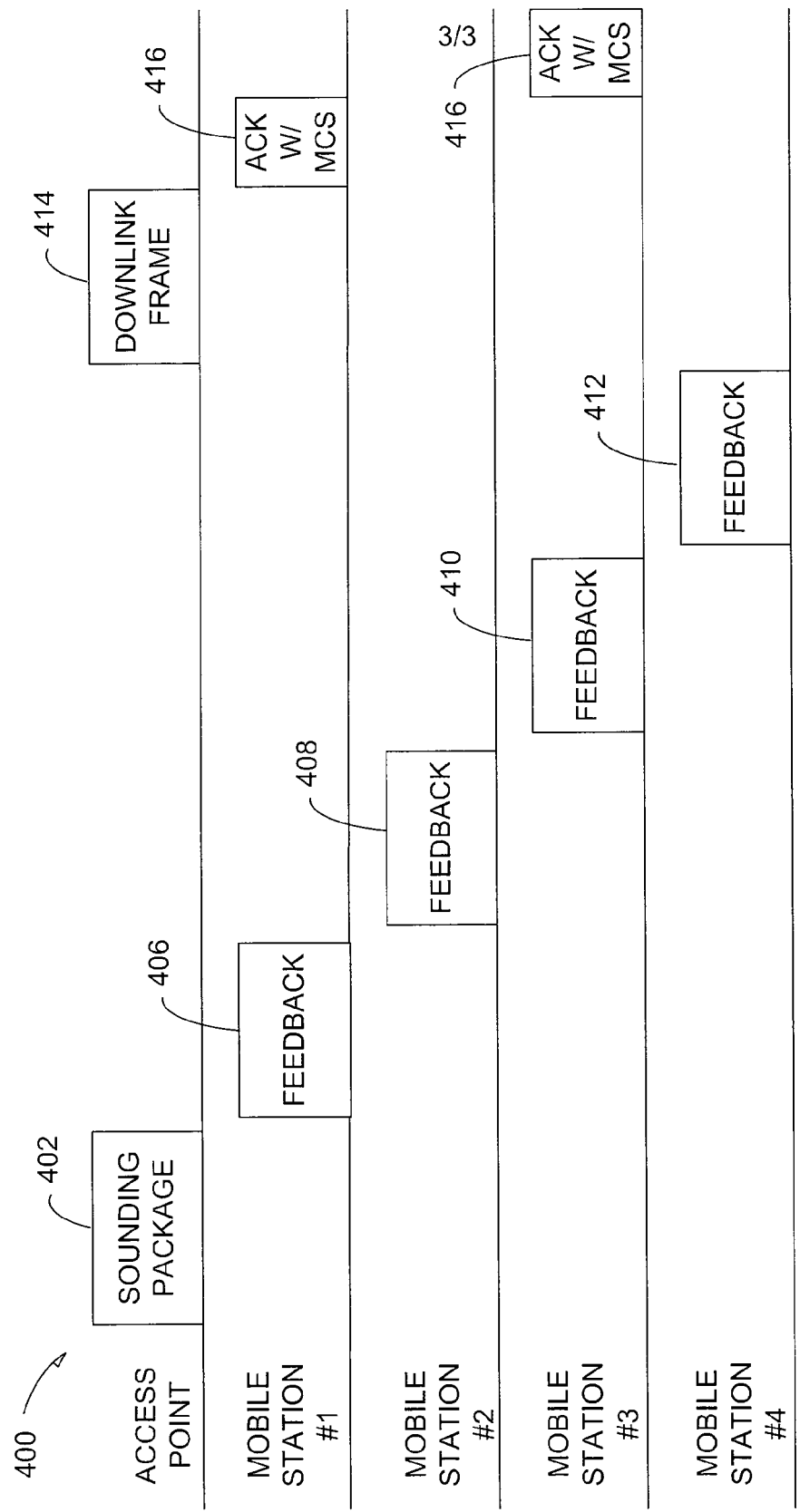
FIG. 4 illustrates an example chart for managing feedback for explicit beamforming in the system of FIG. 1

FIG. 4 illustrates an example timing flowchart 400 for a feedback scheme for explicit beamforming in the MU-MIMO system 100. To start the feedback process, the access point 118 sends out a sounding package 402 to the mobile stations 102. The sounding package 402 can correspond to one or more downlink frames 404. The sounding package 402 can announce the group ID for the downlink frames 404, as well as the media access control (MAC) address for the mobile stations 102 to be associated with the group ID.

The sounding package 402 can also include a feedback schedule for the mobile stations 102. The feedback schedule can identify time slots for each of the mobile stations 102 associated with the Group ID. In an example, in order to efficiently schedule the feedback time slots, the access point 118 determines the length of the feedback from each mobile station 102 and assigns the time slots accordingly. For example, the access point 118 can announce that a first mobile station 102 has a feedback time slot 406 scheduled at the beginning of the feedback period. After determining the length of the feedback from the first mobile station 102, the access point 118 can assign a second mobile station 102 to a feedback time slot 408 immediately following the end of the feedback 406 from the first mobile station 102. The access point 118 can continue assigning feedback time slots 410, 412 in this manner until all the mobile stations 102 associated with the group ID have a time slot in the feedback period.

In an example, in order to determine the length of the feedback to be received from the mobile stations 102, the access point 118 specifies certain parameters for the feedback. For example, the length of the feedback for a mobile station 102 can vary based on the number of downlink streams for the mobile station 102 and the dimension of the feedback matrix received from the mobile station 102.

Accordingly, in an example, the access point 118 specifies the dimension of the feedback matrix for the mobile station 102. The dimension of the feedback matrix assigned by the access point 118 can be set to greater than or equal to the number of downlink streams on which data will be sent to the mobile station 102 in the downlink frame associated with the group ID. In an example, the number of streams allocated to a mobile station 102 is dependent upon the number of different mobile stations 102 to receive transmissions within a given downlink frame. When a large number of mobile stations 102 are to receive transmissions, there may be fewer streams available for use by each mobile station 102. Accordingly, the number of streams allocated to the mobile station 102 may be less than if there were fewer mobile stations 102 to receive transmissions within the downlink frame. In an example, the access point 118 has a maximum of eight streams and a maximum of four different mobile stations 102 per downlink frame. Additionally, in an example, a maximum of four streams can be sent to a single mobile station 102. In an example, the dimension of the feedback matrix assigned to a mobile station 102 can depend on the precoding type as well as the number of downlink streams. For example, when the access point 118 implements a simple MMSE precoding, the dimension of the feedback matrix can be set to equal the number of downlink streams (Ns×Nt). When the access point 118 implements a block diagonal precoding, then the dimension of the feedback matrix can be set to the number of receive antennas (Nr×Nt). The number of streams allocated to a mobile station 102 can also be based on the quality of previous transmissions from the mobile station 102. For example, if the previous transmission experienced bad quality due to high interference between multiple streams, then the access point 118 can reduce the number of streams allocated to the mobile station 102 in future transmissions.

The access point 118 can also specify the feedback type for the mobile station 102 to use. In an example, the feedback types include un-compressed channel state information (CSI) feedback, un-compressed precoding matrix feedback, and compressed precoding matrix feedback. The un-compressed CSI feedback can comprise one or more columns of the Nr×Nt channel matrix, depending on the feedback matrix dimension specified by the access point 118. As used herein, Nr corresponds to the number of receive antennas at the mobile station 102 and Nt corresponds to the number of transmit antennas in the antenna array 116 on the access point 118. Additionally, Ns corresponds to the number of streams allocated to the mobile station 102 in the sounding package 402. The un-compressed precoding matrix has the same dimensions as the un-compressed CSI feedback, but the content of the matrix is the right singular vector of the channel matrix, instead of CSI itself. The compressed precoding matrix comprises a compressed information representing the right singular matrix of the channel matrix. For example, if the access point 118 has four transmit antennas in the antenna array 116, the mobile station 102 has two receive antennas, and the access point 118 indicates in the sounding package 402 that Ns=2, then the un-compressed CSI and precoding matrix would comprise a 4×2 matrix. The compressed precoding matrix would comprise a 4×2 right singular matrix. More compressed feedback types can also be used. In an example, the mobile station 102 notifies the access point 118 of the feedback types that the mobile station 102 supports. In an example, this notification of feedback type support can be provided by the mobile station 102 during association with the access point 118.

In an example, the access point 118 can set the feedback type based on the precoding algorithm used by the access point 118. For example, when the access point 118 is using a simple precoding algorithm, the access point 118 can specify a feedback type providing less information from the mobile stations 102. When the access point 118 is using a complex precoding algorithm, the access point 118 can specify a feedback type providing more information from the mobile stations 102. For example, if the access point 118 is using the simple minimum mean square error (MMSE) precoding algorithm, then the access point 118 can specify that the mobile stations 102 send feedback using the compressed precoding matrix. If the access point implements a block diagonal precoding algorithm then AP can specify full channel matrix (e.g., un-compressed CSI) from the mobile stations 102. In an example, when the access point 118 specifies that the mobile station 102 is to receive fewer streams than the number of receive antennas at the mobile station 102. In an example, the mobile station 102 can provide feedback based on reception with certain receive antennas and can receive the corresponding downlink frame with the same receive antennas.

In an example, the access point 118 can also specify the modulation and coding scheme (MCS) to be used by the mobile station 102 when encoding the feedback for sending to the access point 118. In any case, once the access point 118 has specified these parameters, the access point 118 can determine that the length of the feedback from each mobile station 102 and assign time slots for the feedback according to the length of the feedback.

When a mobile station 102 receives a sounding package 402, the mobile station 102 can measure the preamble of the sounding package 402 to determine the reception quality and direction. The mobile station 102 then calculates a feedback matrix of the feedback type (e.g., un-compressed CSI, un-compressed precoding, or compressed precoding) specified in the sounding package 402 based on the reception quality and direction.

In an example, the mobile station 102 can calculate the feedback matrix of the reception quality based on no interference from streams for other mobile stations 102. Advantageously, this method of calculating the feedback matrix can be the same as for single user MIMO which can simplify the processes at the mobile station 102 since the mobile station 102 does not use different processes for MU-MIMO and SU-MIMO. In another example, the mobile station 102 can calculate the feedback matrix based on random and uniform interference from streams for other mobile stations 102. For example, the mobile station 102 can calculate the number of streams for other mobile stations 102 based on the stream allocations provided by the access point 118 in the sounding package 402. The mobile station 102 can then calculate the feedback matrix by assuming an interference signal from all the other streams randomly and uniformly arriving from all directions, where each stream is transmitted with the same transmit power.

Once the mobile station 102 has calculated the feedback matrix, the mobile station 102 sends the feedback matrix to the access point 118 within the time slot allocated to the mobile station 102 and using the MCS announced in the sounding package 402. In an example, in addition to the feedback matrix, the mobile station 102 calculates a preferred MCS for use by the access point 118 in the downlink streams to the mobile station 102. The preferred MCS can be calculated based on no interference from streams to other mobile stations 102, or based on random and uniform interference from streams to other mobile stations 102.

All the mobile stations 102 associated with the group ID can perform the feedback matrix calculation according to the announcements in the sounding package 402 and provide the feedback matrix within the time slot assigned by the sounding package 402.

Once the access point 118 receives the feedback matrixes from the mobile stations 102, the access point 118 can adjust the parameters of the precoding algorithm based on the feedback matrixes. In an example, for mobile stations 102 that calculated the feedback matrix based on no interference from streams for other mobile stations 102, the access point 118 can adjust the feedback matrix to account for interference from other streams. In another example, the access point 118 can implement the feedback matrix without adjustment in the precoding algorithm. Once the access point 118 has adjusted the parameters based on the feedback matrixes received, the access point 118 can transmit the downlink frame 414 that corresponds to the group ID in the sounding package 402. Accordingly, the downlink frame 414 can be generated using precoding adjustments based on the feedback from the mobile stations 102. In an example, the access point 118 applies the adjusted precoding based on the feedback to the training field as well as to data fields (e.g., MAC protocol data units (MPDUs)) within the downlink frame 414.

A mobile station 102 associated with the group ID can then receive the downlink frame 414 and decode the information therein. The mobile station 102 can then send an acknowledge (ACK) or negative acknowledgement (NACK) information 416 on an appropriate channel (e.g., an ACK channel) to the access point 118 evidencing whether the downlink frame 414 was accurately received by the mobile station 102. In addition, in some examples, the mobile station 102 can perform an additional calculation to refine the preferred MCS to the used by the access point 118 based on the reception quality of the downlink frame 414. This refined MCS can be piggybacked with ACK/NACK information 416 and sent to the access point 118 on, for example, an ACK channel. The access point 118 can then use the refined MCS for future transmissions to the mobile station 102. Advantageously, this refined MCS takes into account actual interference from streams to other mobile stations 102, since these other streams were transmitted in the downlink frame 414 along with the stream(s) to the mobile station 102 performing the calculation.

Embodiments may be implemented in one or a combination of hardware, firmware and software. Embodiments may also be implemented as instructions stored on a computer-readable medium, which may be read and executed by at least one processing circuitry to perform the operations described herein. A computer-readable medium may include any mechanism for storing in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method to manage feedback in a communication system, the method comprising:
   sending a sounding package to a mobile station of a group of mobile stations over an antenna array of a multiple user multiple input multiple output (MU-MIMO) system, the sounding package to include multiple feedback parameters for feedback from the mobile station, the feedback parameters to comprise a feedback type and a feedback dimension; and
   receiving a feedback matrix from the mobile station in accordance with the feedback type and the feedback dimension of the sounding package.

2. The method of claim 1, the sounding package to announce the mobile station.

3. The method of claim 1, comprising receiving modulation and coding scheme feedback from the mobile station.

4. The method of claim 1, comprising receiving modulation and coding scheme feedback from the mobile station, the modulation and coding scheme feedback comprising a modulation and coding scheme.

5. The method of claim 1, comprising receiving modulation and coding scheme feedback from the mobile station, the modulation and coding scheme feedback comprising interference information.

6. The method of claim 1, comprising receiving modulation and coding scheme feedback from the mobile station, the modulation and coding scheme feedback comprising channel state information.

7. The method of claim 1, comprising sending a modulation and coding scheme for the feedback to the mobile station.

8. An access point to manage feedback in a wireless communication system, the access point comprising:
   processing circuitry to generate a sounding package to announce a mobile station, the sounding package to include a feedback schedule for the mobile station and a feedback type for the mobile station; and
   a radio-frequency (RF) transceiver coupled to the processing circuitry, the transceiver to send the sounding package to the mobile station over a downlink channel of a multiple user multiple input multiple output (MU-MIMO) system utilizing an orthogonal frequency division multiple access (OFDMA) technique and receive a feedback matrix from the mobile station in accordance with the feedback schedule and the feedback type.

9. The access point of claim 8, the sounding package to include a dimension of the feedback matrix.

10. The access point of claim 8, the RF transceiver to receive modulation and coding scheme feedback for the mobile station.

11. The access point of claim 8, the RF transceiver to receive modulation and coding scheme feedback for the mobile station, the modulation and coding scheme feedback comprising a modulation and coding scheme.

12. The access point of claim 8, the RF transceiver to receive modulation and coding scheme feedback for the mobile station, the modulation and coding scheme feedback comprising interference information.

13. The access point of claim 8, the RF transceiver to receive modulation and coding scheme feedback for the mobile station, the modulation and coding scheme feedback comprising channel state information.

14. The access point of claim 8, the RF transceiver to send to the mobile station a downlink frame having a modulation and coding scheme based on modulation and coding scheme feedback received from the mobile station.

15. The access point of claim 8, comprising:
   a memory coupled to the processing circuitry, the memory to store instructions to generate the sounding package; and
   an antenna array coupled to the RF transceiver, the antenna array to transmit information to the mobile station using adaptive beamforming based on the feedback matrix.

16. One or more non-transitory computer-readable storage media containing instructions that when executed manages feedback in a communication system, the instructions to:
   generate a sounding package to announce a mobile station, the sounding package to include a feedback schedule for the mobile station and a feedback type for the mobile station;
   cause transmission of the sounding package to the mobile station over a downlink channel of a multiple user multiple input multiple output (MU-MIMO) system utilizing an orthogonal frequency division multiple access (OFDMA) technique; and
   receive a feedback matrix from the mobile station in accordance with the feedback schedule and the feedback type.

17. The one or more non-transitory computer-readable storage media of claim 16, the sounding package to include a dimension of the feedback matrix.

* * * * *